United States Patent
Takayama et al.

(10) Patent No.: US 10,766,978 B2
(45) Date of Patent: Sep. 8, 2020

(54) POLYVINYL ALCOHOL AND METHOD FOR PRODUCING SAME

(71) Applicants: KURARAY CO., LTD., Kurashiki-shi (JP); UNIVERSITE DE LIEGE, Liege (BE)

(72) Inventors: Takumi Takayama, Kurashiki (JP); Yusuke Amano, Kurashiki (JP); Kazuhiko Maekawa, Kurashiki (JP); Christophe Detrembleur, Liege (BE); Antoine Debuigne, Liege (BE); Christine Jerome, Liege (BE)

(73) Assignees: KURARAY CO., LTD., Kurashiki-shi (JP); UNIVERSITE DE LIEGE, Liege (BE)

( * ) Notice: Subject to any disclaimer, the term of this patent is extended or adjusted under 35 U.S.C. 154(b) by 63 days.

(21) Appl. No.: 16/089,483

(22) PCT Filed: Mar. 30, 2017

(86) PCT No.: PCT/JP2017/013493
§ 371 (c)(1),
(2) Date: Sep. 28, 2018

(87) PCT Pub. No.: WO2017/170974
PCT Pub. Date: Oct. 5, 2017

(65) Prior Publication Data
US 2019/0119414 A1   Apr. 25, 2019

(30) Foreign Application Priority Data

Mar. 31, 2016   (JP) .................................. 2016-072465

(51) Int. Cl.
| | | |
|---|---|---|
| *C08F 16/06* | (2006.01) | |
| *C08F 18/08* | (2006.01) | |
| *C08F 6/08* | (2006.01) | |
| *B01J 31/22* | (2006.01) | |
| *C08F 8/12* | (2006.01) | |
| *C08K 5/23* | (2006.01) | |

(52) U.S. Cl.
CPC ........... *C08F 16/06* (2013.01); *B01J 31/2234* (2013.01); *C08F 6/08* (2013.01); *C08F 8/12* (2013.01); *C08F 18/08* (2013.01); *B01J 2531/025* (2013.01); *B01J 2531/845* (2013.01); *C08F 2500/01* (2013.01); *C08F 2500/03* (2013.01); *C08K 5/235* (2013.01)

(58) Field of Classification Search
CPC .... C08F 18/08; C08F 2/38; C08F 8/12; C08F 16/06; C08F 6/08; C08F 118/08; B01J 2531/845

See application file for complete search history.

(56) References Cited

U.S. PATENT DOCUMENTS

| 4,351,807 A | * | 9/1982 | Tels ................... B01D 11/0457 423/100 |
| 4,356,319 A | * | 10/1982 | Roffia ...................... B01J 31/04 562/414 |
| 2019/0100607 A1 | * | 4/2019 | Amano ................... C08F 16/06 |

FOREIGN PATENT DOCUMENTS

| JP | 11-147914 A | | 6/1999 |
| RU | 2265617 | * | 12/2005 |
| WO | WO 2011/118598 A1 | | 9/2011 |

OTHER PUBLICATIONS

Bojko et al., electronic translation of RU 2265617, Dec. 2005.*
Basketter, David A., STN AN 2004:29141, Nickel, chromium and cobalt in consumer products: revisiting safe levels in the new millennium Safety and Environmental Assurance Centre, Unilever Colworth, Bedford, UK Contact Dermatitis (2003), 49(1), 1-7.*
International Search Report dated Jun. 27, 2017 in PCT/JP2017/013493 filed on Mar. 30, 2017.
Iovu, M. C. et al.,"Controlled/Living Radical Polymerization of Vinyl Acetate by Degenerative Transfer with Alkyl Iodides", Macromolecules, 2003, vol. 36, No. 25, pp. 9346-9354.
Debuigne, A. et al., "Highly Efficient Cobalt-Mediated Radical Polymerization of Vinyl Acetate", Angewandte Chemie International Edition, 2005, vol. 44, pp. 1101-1104.
Debuigne, A. et al., Synthesis of End-Functional Poly(vinyl acetate) by Cobalt-Mediated Radical Polymerization, Macromolecules, 2005, vol. 38,No. 13, pp. 5452-5458.
Debuigne, A. et.al., "Amphiphilic Poly(vinyl acetate)-b-poly(N-vinylpyrrolidone) and Novel Double Hydrophilic Poly(vinyl alcohol)-b-poly(N-vinylpyrrolidone) Block Copolymers Prepared by Cobalt-Mediated Radical Polymerization" Macromolecules, 2007, vol. 40, No. 20, pp. 7111-7118.

(Continued)

*Primary Examiner* — Jeffrey C Mullis
(74) *Attorney, Agent, or Firm* — Oblon, McClelland, Maier & Neustadt, L.L.P.

(57) ABSTRACT

A polyvinyl alcohol is produced in a method comprising: a polymerization step comprising polymerizing vinyl ester monomers by controlled radical polymerization in the presence of a radical initiator and an organic cobalt complex to obtain a polymer solution containing a polyvinyl ester; an extraction step comprising extracting a cobalt complex from the polymer solution by contacting an aqueous solution containing a water-soluble ligand with the polymer solution; and a saponification step comprising saponifying the polyvinyl ester after the extraction step to obtain a polyvinyl alcohol. A method for producing a polyvinyl alcohol is thus provided that has a narrow molecular weight distribution and a high number-average molecular weight with good hue and further good solubility in water.

15 Claims, No Drawings

(56) References Cited

OTHER PUBLICATIONS

Detrembleur, C. et al., "Preparation of Well-Defined PVOH/C60 Nanohybrids by Cobalt-Mediated Polymerization of Vinyl Acetate", Macromolecular Rapid Communications, 2006, vol. 27, No. 7, pp. 498-504.

Debuigne, A. et.al., "Synthesis of Novel Well-Defined Poly(vinyl acetate)-b-poly(acrylonitrile) and Derivatized Water-Soluble Poly-(vinyl alcohol)-b-poly(acrylic acid) Block Copolymers by Cobalt-Mediated Radical Polymerization", Macromolecules, 2008, vol. 41, No. 7, pp. 2353-2360.

Bryaskova, R. et. al., "Copolymerization of Vinyl Acetate with 1-Octene and Ethylene by Cobalt-Mediated Radical Polymerization", J Polym Sci Part A, 2007, vol. 45, No. 12, pp. 2532-2542.

* cited by examiner

POLYVINYL ALCOHOL AND METHOD FOR PRODUCING SAME

TECHNICAL FIELD

The present invention relates to a polyvinyl alcohol, having a narrow molecular weight distribution and a high number-average molecular weight with good hue, and a method for producing the same.

BACKGROUND ART

Polyvinyl alcohol (hereinafter, may be abbreviated as PVA) resins are crystalline water-soluble polymer materials and are widely applied to emulsifiers, suspensions, surfactants, fiber treating agents, various binders, paper treating agents, adhesives, films, and the like using their excellent water solubility and film properties (strength, grease resistance, film formability, oxygen gas barrier properties, etc.). Conventionally, PVAs having different degrees of saponification and polymerization are employed depending on the use. Various modified PVAs with special functions by introducing a functional group into PVAs are proposed.

Polyvinyl alcohols are industrially produced by saponification of polyvinyl acetate that is obtained by radically polymerizing vinyl acetate. In radical polymerization reaction of vinyl acetate, various types of side reaction, such as chain transfer reaction and recombination termination reaction, occur during the polymerization, and thus it is generally considered difficult to precisely control the molecular weight distribution, the end structure, and the like of the polyvinyl acetate (and polyvinyl alcohols) thus obtained. For improvement in thermal stability and mechanical properties of polyvinyl alcohols, polymers having a less content of a low molecular weight polymer, that is, polymers having a high molecular weight and a narrow molecular weight distribution are considered preferred.

In recent years, with the advances in the so-called living radical polymerization technique, some methods for controlling radical polymerization reaction of vinyl acetate have been proposed. For example, a method is proposed that comprises radical polymerization reaction of vinyl acetate in the presence of a radical polymerization initiator and a specific control agent to obtain polyvinyl acetate having a narrow molecular weight distribution. In such polymerization reaction, a propagating radical end of the molecular chain of polyvinyl acetate is covalently bonded with the control agent to form dormant species. The polymerization progresses while establishing an equilibrium between the dormant species and radical species generated by dissociation of the dormant species. Such polymerization reaction is referred to as controlled radical polymerization.

However, it used to be difficult to obtain polyvinyl acetate with a high molecular weight by controlled radical polymerization in the past. This is considered to be because a radical is thermally extremely unstable that is generated at an end of a head-to-head bond (a bond having acetyl groups of vinyl acetate adjacent to each other) generated with a certain probability during the polymerization and the equilibrium is thus largely shifted to the dormant species side, resulting in no further progress of the polymerization reaction. In contrast, in a case where the polymerization temperature is raised to promote thermal dissociation of the dormant species, the controllability becomes worse in spite of the progress of the reaction. Accordingly, it has been extremely difficult to obtain polyvinyl acetate with a high molecular weight while maintaining controllability.

Regarding such a problem, Patent Document 1 reports an example in which radical polymerization reaction of vinyl acetate is performed in the presence of a control agent containing a radical polymerization initiator and an iodine compound, thereby synthesizing polyvinyl acetate having a number-average molecular weight (Mn) of 92,000 and a molecular weight distribution (Mw/Mn) of 1.57 and saponifying it to produce a polyvinyl alcohol. However, in the polymerization method using an iodine compound as a control agent, it is known that an aldehyde group is formed at a polymerization end of polyvinyl acetate (e.g., refer to Non-Patent Document 1). In a case of saponifying such polyvinyl acetate having an aldehyde group at an end, it is known that a conjugated polyene structure where plural carbon-carbon double bonds are conjugated is formed to obtain markedly colored polyvinyl alcohols.

Recently, a technique has been proposed to synthesize polyvinyl acetate having a narrow molecular weight distribution and a high molecular weight by controlled radical polymerization using an organic cobalt complex as a control agent. In the polymerization reaction, the propagating radical end of the molecular chain of polyvinyl acetate is covalently bonded with a cobalt atom of an organic cobalt complex to form dormant species. The polymerization progresses while establishing equilibrium between the dormant species and radical species generated by dissociation of the dormant species. For example, Non-Patent Document 2 reports an example in which vinyl acetate is polymerized in the presence of cobalt (II) acetylacetonate, thereby synthesizing polyvinyl acetate having a number-average molecular weight (Mn) of 99,000 and a molecular weight distribution (Mw/Mn) of 1.33.

Non-Patent Document 3 describes that a polyvinyl acetate chain obtained by polymerizing vinyl acetate in the presence of cobalt (II) acetylacetonate is treated with 1-propanethiol. While the polyvinyl acetate chain forms a dormant species bonded with a cobalt (III) complex at an end, an end radical formed by cleavage of the dormant species reacts with 1-propanethiol, thereby allowing separation of the cobalt complex from the polyvinyl acetate chain. While polyvinyl acetate forming the dormant species is green, it is described that the separated cobalt complex is precipitated, followed by filtration through celite for removal to obtain less colored polyvinyl acetate. Instead of 1-propanethiol, TEMPO (2,2,6,6-tetramethylpiperidine 1-oxyl) as a stable radical compound may be used for bonding of TEMPO with the end radical to trap a radical. It is described that, in this case as well, the cobalt complex is filtered with acidic alumina for removal to obtain colorless polyvinyl acetate.

As just described, according to the method described in Non-Patent Document 3, it is possible to obtain less colored polyvinyl acetate. However, Non-Patent Document 3 does not describe that the polyvinyl acetate thus obtained is subjected to saponification to yield polyvinyl alcohol. As a result of experiments by the present inventors, it was found that the polyvinyl alcohol obtained by saponifying the polyvinyl acetate obtained in accordance with Non-Patent Document 3 was colored. For filtration and sufficient removal of the cobalt complex contained in the polymer solution, the cobalt complex has to be precipitated by appropriately selecting the concentration of the solution and the type of solvent. However, to efficiently precipitate the cobalt complex by filtration, a large amount of solvent is required for dilution and a pressure raise due to the precipitates, flow rate reduction due to the filtration, and the like also occur, and thus productivity turns out to be reduced.

PRIOR ART DOCUMENT

Patent Document

Patent Document 1: JP 11-147914A

Non-Patent Document

Non-Patent Document 1: Controlled/Living Radical Polymerization of Vinyl Acetate by Degenerative Transfer with Alkyl Iodides, Macromolecules, 2003, vol.36, p 9346-9354

Non-Patent Document 2: Highly Efficient Cobalt-Mediated Radical Polymerization of Vinyl Acetate, Angewandte Chemie International Edition, 2005, vol.44, p 1101-1104

Non-Patent Document 3: Synthesis of End-Functional Poly(vinyl acetate) by Cobalt-Mediated Radical Polymerization, Macromolecules, 2005, vol.38, p 5452-5458

SUMMARY OF THE INVENTION

Problems to be Solved by the Invention

The present invention has been made to solve the above problems, and it is an object thereof to provide a polyvinyl alcohol, having a narrow molecular weight distribution and a high number-average molecular weight with good hue, and a method for producing the polyvinyl alcohol.

Means for Solving the Problems

The above problems are solved by providing a method for producing a polyvinyl alcohol comprising: a polymerization step comprising polymerizing vinyl ester monomers by controlled radical polymerization in the presence of a radical initiator and an organic cobalt complex to obtain a polymer solution containing a polyvinyl ester; an extraction step comprising extracting a cobalt complex from the polymer solution by contacting an aqueous solution containing a water-soluble ligand with the polymer solution; and a saponification step comprising saponifying the polyvinyl ester after the extraction step to obtain the polyvinyl alcohol.

In this context, it is preferred that the polyvinyl ester after the extraction step has a cobalt element content from 0.01 to 100 ppm. It is also preferred that the polyvinyl alcohol after the saponification step has a cobalt element content from 0.01 to 50 ppm. It is also preferred that the water-soluble ligand is an acid having a pKa at 25° C. from 0 to 12. It is also preferred that the water-soluble ligand is carboxylic acid.

The above problems are also solved by providing a polyvinyl alcohol having a number-average molecular weight (Mn) from 4,400 to 440,000, a molecular weight distribution (Mw/Mn) from 1.05 to 1.70, a degree of saponification from 80 to 99.99 mol %, and a cobalt element content from 0.01 to 50 ppm.

Effects of the Invention

The polyvinyl alcohol of the present invention has a narrow molecular weight distribution and a high number-average molecular weight with good hue. Since the polyvinyl alcohol of the present invention has good solubility in water, it is applicable to various types of use requiring water solubility. Since the polyvinyl alcohol has a low yellow index (YI), it is also applicable to various types of use with importance on appearance. According to the production method of the present invention, it is possible to produce such a polyvinyl alcohol.

MODES FOR CARRYING OUT THE INVENTION

No polyvinyl alcohol has been previously known that has a narrow molecular weight distribution and a high number-average molecular weight with good hue. The present inventors found a method for producing such a polyvinyl alcohol for the first time. A preferred method for producing a polyvinyl alcohol of the present invention comprises: a polymerization step comprising polymerizing vinyl ester monomers by controlled radical polymerization in the presence of a radical initiator and an organic cobalt complex to obtain a polymer solution containing a polyvinyl ester; an extraction step comprising extracting a cobalt complex from the polymer solution by contacting an aqueous solution containing a water-soluble ligand with the polymer solution; and a saponification step comprising saponifying the polyvinyl ester after the extraction step to obtain a polyvinyl alcohol. The production method is described below in detail.

Firstly, the polymerization step is described. In the polymerization step, vinyl ester monomers are polymerized by controlled radical polymerization in the presence of a radical initiator and an organic cobalt complex to obtain a polymer solution containing polyvinyl ester. The controlled radical polymerization is polymerization reaction where reaction progresses in an equilibrium state between a propagating radical end (active species) and covalent species (dormant species) formed by the propagating radical end bonded with a control agent. In the present invention, an organic cobalt complex is used as the control agent.

Examples of the vinyl ester monomers used in the present invention may include vinyl formate, vinyl acetate, vinyl trifluoroacetate, vinyl propionate, vinyl valerate, vinyl butyrate, vinyl isobutyrate, vinyl pivalate, vinyl caprate, vinyl laurate, vinyl stearate, vinyl benzoate, vinyl versatate, and the like. From an economic perspective, vinyl acetate is preferably used.

The polyvinyl ester produced in the present invention may be a product of copolymerization with copolymerizable ethylenic unsaturated monomers without impairing the effects of the present invention. Examples of the ethylenic unsaturated monomers may include: olefins, such as ethylene, propylene, 1-butene, and isobutene; unsaturated carboxylic acids, such as acrylic acid, methacrylic acid, crotonic acid, phthalic acid (anhydride), maleic acid (anhydride), and itaconic acid (anhydride), salts thereof, mono- or di-alkyl (carbon number from 1 to 18) esters thereof, or anhydrides thereof; acrylamides, such as acrylamide, N-alkyl (carbon number from 1 to 18) acrylamide, N,N-dimethylacrylamide, 2-acrylamide propanesulfonate or salt thereof, and acrylamide propyldimethylamine or acid salts thereof or quaternary salt thereof; methacrylamides, such as methacrylamide, N-alkyl (carbon number from 1 to 18) methacrylamide, N,N-dimethylmethacrylamide, 2-methacrylamide propanesulfonate or salt thereof, and methacrylamide propyldimethylamine or acid salts thereof or quaternary salt thereof; N-vinylamides, such as N-vinyl pyrrolidone, N-vinyl formamide, and N-vinyl acetamide; vinyl cyanides, such as acrylonitrile and methacrylonitrile; vinyl ethers, such as alkyl (carbon number from 1 to 18) vinyl ether, hydroxyalkyl vinyl ether, and alkoxyalkyl vinyl ether; vinyl halides, such as vinyl chloride, vinylidene chloride, vinyl fluoride, vinylidene fluoride, and vinyl bromide; vinyl silanes, such as trimethoxyvinyl silane; allyl acetate; allyl chloride; allyl alcohol; dimethylallyl alcohol; trimethyl-(3-acrylamide dimethylpropyl)-ammonium chloride; acrylamide-2-methylpropanesulfonic acid; and the like.

Examples of the method for polymerizing the vinyl ester monomers may include known methods, such as bulk polymerization, solution polymerization, suspension polymerization, and emulsion polymerization. Among all, bulk polymerization in which polymerization is conducted in a nonsolvent system or solution polymerization in which polymerization is conducted in various organic solvents is usually employed. To obtain a polymer having a narrow molecular weight distribution, bulk polymerization is preferred that does not use a solvent and a dispersion medium with a possibility of side reactions, such as chain transfer. Meanwhile, solution polymerization is sometimes preferred from the perspective of viscosity control of the reaction liquid, control of the polymerization rate, and the like. Examples of the organic solvent used as the solvent in solution polymerization may include: esters, such as methyl acetate and ethyl acetate; aromatic hydrocarbons, such as benzene and toluene; lower alcohols, such as methanol and ethanol; and the like. Among them, to prevent chain transfer, esters and aromatic hydrocarbons are preferably used. The amount of the solvent may be determined considering the viscosity of the reaction solution in accordance with a target number-average molecular weight of the polyvinyl alcohol. For example, the amount is selected from a mass ratio (solvent/monomer) ranging from 0.01 to 10. The mass ratio (solvent/monomer) is preferably 0.1 or more and is preferably 5 or less.

As the radical initiator used in the polymerization step, conventionally known azo initiators, peroxide initiators, redox initiators, and the like are appropriately selected. Examples of such an azo initiator may include 2,2'-azobisisobutyronitrile, 2,2'-azobis(2,4-dimethylvaleronitrile), 2,2'-azobis(4-methoxy-2,4-dimethylvaleronitrile) ("V-70"), and the like. Examples of such a peroxide initiator include: percarbonate compounds, such as diisopropyl peroxydicarbonate, di-2-ethylhexyl peroxydicarbonate, and diethoxyethyl peroxydicarbonate; perester compounds, such as t-butyl peroxyneodecanate, α-cumyl peroxyneodecanate, and t-butyl peroxydecanate; acetylcyclohexylsulfonyl peroxide; diisobutyryl peroxide; 2,4,4-trimethylpentyl-2-peroxyphenoxy acetate; and the like. Furthermore, the above initiator can be combined with potassium persulfate, ammonium persulfate, hydrogen peroxide, or the like, to be an initiator. Examples of such a redox initiator may include combinations of the above peroxide with a reducing agent, such as sodium hydrogen sulfite, sodium hydrogen carbonate, tartaric acid, L-ascorbic acid, and Rongalite. The amount of the initiator differs according to the polymerization catalyst and thus cannot be unconditionally determined and is arbitrarily selected depending on the polymerization rate.

The organic cobalt complex used as the control agent in the polymerization step may contain a divalent cobalt atom and an organic ligand. Examples of a preferred organic cobalt complex may include cobalt (II) acetylacetonate [Co(acac)$_2$], a cobalt (II) porphyrin complex, and the like. Among all, cobalt (II) acetylacetonate is preferred from the perspective of production costs.

In the controlled radical polymerization used in the present invention, firstly, the radical initiator is decomposed to produce a radical and the radical is bonded with a small number of vinyl ester monomers to produce a short-chain polymer having a radical at a propagating end, and the radical is bonded with an organic cobalt (II) complex, thereby producing a dormant species where covalently bonded with an organic cobalt (III) complex at a polymer end. In a certain period after initiation of the reaction, such short-chain polymer is produced only to be converted to dormant species and thus the degree of polymerization does not substantially increase. Such a period is referred to as an induction period. After consumption of the organic cobalt (II) complex, a growth period begins in which the degree of polymerization increases and most molecular chains in the reaction system have a molecular weight similarly increasing in proportion to polymerization time. This allows production of polyvinyl ester having a narrow molecular weight distribution.

As described above, in the controlled radical polymerization of the present invention, one polyvinyl ester chain is theoretically yielded from one molecule of the organic cobalt complex to be added. Accordingly, the amount of the organic cobalt complex to be added to the reaction liquid is determined considering target number-average molecular weight and rate of polymerization. Usually, based on 100 mol of the vinyl ester monomers, from 0.001 to 1 mol of the organic cobalt complex is preferably used.

A molar number of the generated radical not more than the molar number of the organic cobalt complex causes the polymerization reaction to progress only by a mechanism in which a Co complex is thermally dissociated from the dormant species, resulting in an extremely low polymerization rate depending on the reaction temperature. Accordingly, considering that the radical initiator produces two radicals, the molar number of the radical initiator to be used has to be more than ½ times the molar number of the organic cobalt complex. The amount of active radicals supplied from the initiator generally depends on initiator efficiency and thus there are actually deactivated initiators not used for the formation of dormant species. Accordingly, the molar number of the radical initiator to be used is preferably not less than one time, more preferably not less than 1.5 times, the molar number of the organic cobalt complex. Meanwhile, a molar number of the generated radical excessively more than the molar number of the organic cobalt complex causes an increase in the ratio of uncontrolled radical polymerization and thus broadening of the molecular weight distribution. The molar number of the radical initiator to be used is preferably not more than 10 times, more preferably not more than 6 times, the molar number of the organic cobalt complex.

The polymerization temperature is preferably, for example, from 0° C. to 80° C. A polymerization temperature of less than 0° C. causes an insufficient polymerization rate and thus productivity turns out to be reduced. In this regard, the polymerization temperature is more preferably 10° C. or more and even more preferably 20° C. or more. Meanwhile, a polymerization temperature of more than 80° C. causes broadening of the molecular weight distribution of polyvinyl ester to be obtained. In this regard, the polymerization temperature is more preferably 65° C. or less and even more preferably 50° C. or less. The time taken for the polymerization step in total of the induction period and the growth period is usually from 3 to 50 hours.

In the polymerization step, at the target rate of polymerization, the polymerization reaction is preferably terminated by adding a polymerization terminator to the obtained polymer solution. Such a polymerization terminator is capable of trapping an end radical in a polymer chain to terminate the polymerization reaction. At that point, a cobalt complex is separated from the polymer chain. The polymerization terminator used in the present invention may trap an end radical in a polymer chain and examples include: aromatic hydroxy compounds, such as p-methoxyphenol, hydroquinone, cresol, t-butyl catechol, and p-nitrosophenol; quinone compounds, such as benzoquinone and naphthoquinone; conjugated carboxylic acids, such as muconic acid and sorbic acid; thioethers, such as phenothiazine, distearyl thiodipropionate, and dilauryl thiodipropionate; aromatic amines, such as p-phenylenediamine and N-nitrosodiphenyl amine; nitroxides, such as 2,2,6,6-tetramethylpiperidine 1-oxyl and hydroxy-2,2,6,6-tetramethylpiperidine 1-oxyl; transition metal salts, such as copper acetate, copper dithiocarbamate, and manganese acetate; and the like.

The molar number of the polymerization terminator to be added is preferably from 1 to 100 times the molar number of the added organic cobalt complex. An excessively small molar number of the proton-donating polymerization terminator causes a risk of not sufficiently trapping radicals at polymer ends to deteriorate color tone of the polyvinyl alcohol produced from the polymerization. The molar number of the proton-donating polymerization terminator is thus more preferably 5 times or more the molar number of the organic cobalt complex. Meanwhile, an excessively large molar number of the proton-donating polymerization terminator causes a risk of raising production costs. The molar number of the proton-donating polymerization terminator is more preferably 50 times or less the molar number of the organic cobalt complex.

A temperature of the reaction liquid after adding the polymerization terminator may be a temperature allowing the polymerization terminator to trap a radical and is preferably from 0° C. to 80° C. A temperature of the reaction liquid at less than 0° C. causes too much time taken for the termination step and reduction in productivity. In this regard, the temperature is more preferably 10° C. or more and even more preferably 20° C. or more. Meanwhile, a temperature of the reaction liquid at more than 80° C. causes a risk of unnecessary progression of vinyl acetate polymerization and an increase in the molecular weight distribution (Mw/Mn). In this regard, the temperature is more preferably 70° C. or less and even more preferably 60° C. or less. The time taken for termination of the reaction after adding the polymerization terminator is preferably from 10 minutes to 5 hours. In such a manner, it is possible to obtain a polymer solution containing polyvinyl ester.

An extraction step is performed by contacting an aqueous solution containing a water-soluble ligand with the polymer solution thus obtained to extract the cobalt complex from the polymer solution. As just described, the saponification step performed after removal in advance of a cobalt complex contained in the polyvinyl ester solution allows production of a polyvinyl alcohol with good hue and less likely to be gelated. Specifically, an operation may be performed in which the aqueous solution and the polyvinyl ester solution, which are mutually insoluble, is vigorously stirred to have their interface with a greater area and then left them standing to separate the mixture into an oil layer and a water layer, followed by removal of the water layer. This operation may be repeated a plurality of times. Instead of stirring, a static mixer or the like may be used to have their interface with a greater area. In this context, "to be water soluble" means that 1 g or more of a substance is soluble in 100 g of water at 25° C. Use of a ligand having solubility in water of less than this value does not allow efficient extraction of a cobalt complex.

The water-soluble ligand used in the extraction step is preferably acid having a pKa at 25° C. from 0 to 12. Since use of strong acid having a pKa of less than 0 makes it difficult to efficiently extract a cobalt complex, the pKa is preferably 1.5 or more and more preferably 2.5 or more. Since use of weak acid having a pKa of more than 12 also makes it difficult to efficiently extract a cobalt complex, the pKa is preferably 7 or less. If the acid is polyacid, a first dissociation constant (pKa1) has to be in the above range. The acid having a pKa from 0 to 12 is preferably carboxylic acid or phosphoric acid (pKa1 of 2.1) and more preferably carboxylic acid. Examples of the carboxylic acid may include acetic acid (pKa of 4.76), propionic acid (pKa of 4.87), lactic acid (pKa of 3.86), citric acid (pKa1 of 3.09), and the like. Among all, acetic acid is particularly preferred.

The aqueous solution containing the water-soluble ligand preferably has a pH from 0 to 5. A pH contained in this range allows efficient extraction of a cobalt complex. The pH is more preferably 1 or more and even more preferably 1.5 or more. The pH is more preferably 4 or less and even more preferably 3 or less.

The polyvinyl ester after the extraction step preferably has a cobalt element content from 0.01 to 100 ppm. A cobalt element content in the above range allows the polyvinyl alcohol obtained after saponification to have a tendency of improving the hue and also thermal stability. The cobalt element content is more preferably 90 ppm or less, even more preferably 70 ppm or less, particularly preferably 25 ppm or less, and most preferably 15 ppm or less. Meanwhile, having a cobalt element content of less than 0.01 ppm costs too much for removal work and is not industrially realistic.

In the saponification step, the polyvinyl ester after the extraction step is saponified to obtain a polyvinyl alcohol. Specifically, the polyvinyl ester produced in the previously mentioned method is saponified in the state of being solved in alcohol or hydrous alcohol to obtain a polyvinyl alcohol. Examples of the alcohol used for the saponification reaction may include lower alcohols, such as methanol and ethanol, and methanol is particularly preferably used. The alcohol used for the saponification reaction may contain a solvent, such as acetone, esters like methyl acetate and ethyl acetate, and toluene. Examples of the catalyst used for the saponification reaction may include: hydroxides of alkali metals, such as potassium hydroxide and sodium hydroxide; alkaline catalysts, such as sodium methylate; and acidic catalysts, such as mineral acid. An appropriate temperature of the saponification reaction ranges, for example, from 20° C. to 60° C. When a gelatinous product is precipitated with progress of the saponification reaction, the product is ground at that timing and washed, followed by being dried to obtain a polyvinyl alcohol.

The polyvinyl alcohol of the present invention is a polyvinyl alcohol having a number-average molecular weight (Mn) from 4,400 to 440,000, a molecular weight distribution (Mw/Mn) from 1.05 to 1.70, a degree of saponification from 80 to 99.99 mol %, and a cobalt element content from 0.01 to 50 ppm.

The polyvinyl alcohol of the present invention has a degree of saponification from 80 to 99.99 mol %. A degree of saponification of less than 80 mol % causes a severe decrease in crystallinity of the polyvinyl alcohol and a decrease in physical properties, such as mechanical strength and barrier properties, of a shaped article to be obtained. The degree of saponification is preferably 85 mol % or more and more preferably 90 mol % or more. Meanwhile, a degree of saponification of more than 99.99 mol % causes a risk of difficulty in production of a polyvinyl alcohol and a worsening of formability. The degree of saponification is preferably 99.95 mol % or less.

The polyvinyl alcohol of the present invention has a number-average molecular weight (Mn) from 4,400 to 440,000. Use of the organic cobalt complex as a control agent allows production of a polyvinyl alcohol having a narrow molecular weight distribution and a high number-average molecular weight (Mn). From the perspective of obtaining shaped articles of high strength, the number-average molecular weight (Mn) is preferably 11,000 or more and more preferably 22,000 or more. Meanwhile, an excessively high number-average molecular weight (Mn) sometimes causes too high viscosity of the solution and thus difficulty in handling or sometimes causes a decrease in the rate of dissolution. The number-average molecular weight (Mn) is thus preferably 220,000 or less and more preferably 190,000 or less. A number-average molecular weight (Mn) and a weight-average molecular weight (Mw) in the present invention are values measured in an HFIP column using polymethylmethacrylate as a reference material by gel permeation chromatography (GPC). The measurement method is described in Examples.

The polyvinyl alcohol of the present invention has a molecular weight distribution (Mw/Mn) from 1.05 to 1.70. Polymerization by controlled radical polymerization allows production of a polyvinyl alcohol having a narrow molecular weight distribution. The molecular weight distribution is preferably 1.60 or less and more preferably 1.55 or less. A molecular weight distribution in the above range increases crystallinity of the produced polyvinyl alcohol, leading to excellent gas barrier properties of shaped articles using the polyvinyl alcohol. A molecular weight distribution in the above range and a number-average molecular weight in the above range allow production of shaped articles with high elasticity and high strength.

The polyvinyl alcohol of the present invention preferably has a cobalt element content from 0.01 to 50 ppm. A cobalt element content of more than 50 ppm causes a risk of worse hue and also a risk of remaining of active ends leading to worse thermal stability and gelation. The cobalt element content is more preferably 20 ppm or less and even more preferably 10 ppm or less. Meanwhile, having a cobalt element content of less than 0.01 ppm costs too much for removal work and is not industrially realistic.

The polyvinyl alcohol of the present invention preferably has a yellow index (YI) of 100 or less. The yellow index (YI) is measured in accordance with ASTM D1925. A polyvinyl alcohol having a smaller cobalt element content as described above achieves a polyvinyl alcohol having a low YI with excellent hue. The YI is more preferably 70 or less and even more preferably 60 or less. In this context, the YI is obtained by measuring a sample of powder of a polyvinyl alcohol resin spread over a laboratory dish not to press the powder using a spectrophotometric colorimeter (D65 light source, CM-A120 white calibration plate, specular reflection measurement SCE). Specifically, the YI is a value measured in accordance with the method described in Examples.

Examples of the method for molding the polyvinyl alcohol of the present invention may include a method comprising forming from the form of a solution, such as water and dimethyl sulfoxide, and a method comprising forming by heating for plasticization of a polyvinyl alcohol, for example, extrusion molding, injection molding, inflation molding, press molding, blow molding, and the like. By these methods, shaped articles are obtained in an arbitrary shape, such as fiber, a film, a sheet, a tube, and a bottle.

In the polyvinyl alcohol of the present invention, various additives may be blended as long as the effects of the present invention are not impaired. Examples of the additives may include fillers, process stabilizers such as a copper compound, weathering agents, colorants, ultraviolet absorbers, light stabilizers, antioxidants, antistatic agents, flame retardants, plasticizers, other resins such as starch, lubricants, perfumes, defoamers, deodorants, extenders, removers, mold releases, reinforcements, crosslinkers, mildewcides, antiseptics, crystallization retardants, and the like.

The polyvinyl alcohol of the present invention is applicable to various types of use utilizing its properties. Examples of such use may include surfactants, paper coating agents, paper internal agents, pigment binders, adhesives, nonwoven fabric binders, paints, fiber treating agents, fiber sizings, dispersion stabilizers, films, sheets, bottles, fibers, thickeners, flocculants, soil improvers, and the like.

EXAMPLES

The present invention is described below more in detail by way of Examples. Note that the present invention is not limited at all by Examples below. Measurement and evaluation in Examples and Comparative Examples were made in the following methods.

[Measurement of Number-Average Molecular Weight (Mn) and Molecular Weight Distribution (Mw/Mn)]

Using a size exclusion high speed liquid chromatograph "HLC-8320GPC" manufactured by Tosoh Corp., a number-average molecular weight (Mn) and a molecular weight distribution (Mw/Mn) were measured. Measurement conditions were as follows.

Column: two HFIP columns "GMHHR-H(S)" manufactured by Tosoh Corp., serial connection
Reference material: polymethylmethacrylate
Solvent and mobile phase: sodium trifluoroacetate-HFIP solution (concentration of 20 mM)
Flow rate: 0.2 mL/min.
Temperature: 40° C.
Sample solution concentration: 0.1 wt % (filtered through a filter with an opening diameter of 0.45 μm)
Injected amount: 10 μL
Detector: RI

[Cobalt Element Content]

0.5 g of a polymer was heated and dissolved in concentrated nitric acid and then diluted with ion-exchange water to obtain 20 mL of a nitric acid solution of the polymer. From a cobalt element concentration (mg/L) of the solution measured with an ICP emission spectrometer (IRIS-AP, manufactured by Nippon Jarrell-Ash Co. Ltd.), a cobalt element content (ppm) in the polymer was obtained.

[Evaluation of Hue (YI)]

The YI (ASTM D1925) of powder of the produced polyvinyl alcohol was measured using a spectrophotometric colorimeter "CM-3500d" manufactured by Konica Minolta, Inc. (light source: D65, CM-A120 white calibration plate, CM-A126 laboratory dish set used, specular reflection measurement SCE, measured diameter of ϕ30 mm). To the laboratory dish, 5 g of the sample was added, a side was tapped not to for shaking press the powder, and the powder was evenly and uniformly spread. In this condition, measurement was performed 10 times in total (each time, the laboratory dish was shaken once before remeasurement) and an average of them was obtained as the YI of the resin.

[Evaluation of Rate of Dissolution in Water]

The polyvinyl alcohol was added to ion-exchange water to have the concentration of 4 mass % and was heated and stirred at 100° C. to be dissolved. The dissolution performance was determined by the following criteria.

A: completely dissolved within 1 hour after a temperature raise.

B: completely dissolved between 1 and 3 hours after a temperature raise.

C: completely dissolved between 3 and 6 hours after a temperature raise.

D: completely dissolved between 6 and 12 hours after a temperature raise.

E: taken time of more than 12 hours after a temperature raise until complete dissolution or not completely dissolved with, for example, developing cloudy points.

Polymerization Example 1

To a reactor provided with a stirrer, a reflux condenser tube, and an initiator addition port, 99.83 parts by mass of vinyl acetate and 0.04 parts by mass of cobalt (II) acetylacetonate were added, and inert gas purge was performed in which inside the reactor was vacuumed and then nitrogen was introduced. After that, 0.13 parts by mass of V-70 [2,2'-azobis(4-methoxy-2,4-dimethylvaleronitrile)] was added as an initiator, and inert gas purge was performed in which inside the reactor was vacuumed and then nitrogen was introduced. After that, the reactor was immersed in a water bath and heated and stirred to have an internal temperature at 30° C. Sampling was appropriately performed and progress of the polymerization was confirmed from the solid content concentration. When the conversion of vinyl acetate reached 30%, the water bath was substituted to iced water bath for rapidly cooling the reactor to have the internal temperature of 10° C. or less. Here, 0.36 parts by mass of sorbic acid was added as a polymerization terminator in the form of a methanol solution with a concentration of 10 mass %.

After adding the polymerization terminator, the reactor was connected to a vacuum line to distill off the residual vinyl acetate at 15° C. under reduced pressure. During visual confirmation of inside the reactor, distillation was continued while methanol was appropriately added upon a viscosity rise. The internal temperature was further raised to 50° C. and heated and stirred for 1 hour. After that, the reactor was cooled to 30° C. and methanol was distilled off at 35° C. under reduced pressure while adding ethyl acetate to obtain a polyvinyl acetate solution PVAc-A. These production conditions are collectively shown in Table 1.

Polymerization Example 2

Polymerization reaction of vinyl acetate was performed in the same conditions as those in Polymerization Example 1 other than adding 99.77 parts by mass of vinyl acetate, 0.05 parts by mass of cobalt (II) acetylacetonate, and 0.18 parts by mass of V-70 as an initiator. When the conversion of vinyl acetate reached 30%, the water bath was substituted to iced water bath for rapidly cooling the reactor to have the internal temperature of 10° C. or less. Here, 0.72 parts by mass of sorbic acid was added as a polymerization terminator in the form of a methanol solution with a concentration of 10 mass % and same operations were conducted later as those in the method described in Polymerization Example 1 to obtain a polyvinyl acetate solution PVAc-B. These production conditions are collectively shown in Table 1.

Polymerization Example 3

79.94 parts by mass of vinyl acetate and 0.02 parts by mass of cobalt (II) acetylacetonate were added and inert gas purge was performed in which inside the reactor was vacuumed and then nitrogen was introduced. After that, other than adding 19.98 parts by mass of degassed and dehydrated methyl acetate and 0.06 parts by mass of V-70 as an initiator, polymerization reaction of vinyl acetate was performed in the same conditions as those in Polymerization Example 1. When the conversion of vinyl acetate reached 20%, the water bath was substituted to iced water bath for rapidly cooling the reactor to have the internal temperature of 10° C. or less. Here, 0.23 parts by mass of sorbic acid was added as a polymerization terminator in the form of a methanol solution with a concentration of 10 mass % and same operations were conducted later as those in the method described in Polymerization Example 1 to obtain a polyvinyl acetate solution PVAc-C. These production conditions are collectively shown in Table 1.

Example 1

To 60 parts by mass of the polyvinyl acetate solution PVAc-A, 40 parts by mass of an aqueous acetic acid solution (pH of 2.0) with a concentration of 25 mass % was added and vigorously stirred and then a water layer was removed, and this operation was repeated 5 times to extract a cobalt complex from an organic layer. The organic layer thus obtained was dried in the conditions of 30° C. and 0.1 atmospheric pressure to obtain polyvinyl acetate (cobalt content of 5 ppm) after removal of the volatile component. In methanol, 240 parts by mass of the polyvinyl acetate thus obtained was dissolved to have a concentration of 30 mass % and added to the same reactor as that in Polymerization Example 1. A water bath was heated until an internal temperature reached 40° C. while heating and stirring. Here, 24.9 parts by mass of a methanol solution (concentration of 14 mass %) of sodium hydroxide was added and saponified at 40° C. At this point, sodium hydroxide had a molar ratio of 0.03 to vinyl acetate monomer units in the polyvinyl acetate. A gel product thus generated was ground by a grinder and further left at 40° C. for progress of saponification for 1 hour. After that, 200 parts by mass of methyl acetate was added to neutralize the remaining alkali. Termination of the neutralization was confirmed using a phenolphthalein indicator, followed by filtration to obtain a solid. To the solid, 500 parts by mass of methanol was added for heat reflux for 1 hour and washing. This washing operation was repeated three times, and then a solid obtained by centrifugal dewatering was dried in a vacuum drier at 40° C. for 24 hours to yield an intended polyvinyl alcohol. The polyvinyl alcohol thus obtained had a degree of saponification of 99.9 mol %, a number-average molecular weight (Mn) of 108,600, a molecular weight distribution (Mw/Mn) of 1.5, and a cobalt content of 1 ppm. The hue (YI) was 25.6. The rate of dissolution was evaluated as A. These evaluation results are collectively shown in Table 2.

Example 2

To 60 parts by mass of the polyvinyl acetate solution PVAc-B, 40 parts by mass of an aqueous acetic acid solution (pH of 2.3) with a concentration of 10 mass % was added and same operations were conducted later as those in the method described in Example 1 to obtain a polyvinyl acetate (cobalt content of 20 ppm). The polyvinyl acetate thus obtained was saponified in the same manner as in Example 1 to yield a polyvinyl alcohol. The polyvinyl alcohol thus produced was evaluated in the same manner as in Example 1 and the results are collectively shown in Table 2.

Example 3

To 60 parts by mass of the polyvinyl acetate solution PVAc-C, 40 parts by mass of an aqueous acetic acid solution (pH of 2.3) with a concentration of 10 mass % was added and same operations were conducted later as those in the method described in Example 1 to obtain a polyvinyl acetate (cobalt content of 8 ppm). The polyvinyl acetate thus obtained was saponified in the same manner as in Example 1 to yield a polyvinyl alcohol. The polyvinyl alcohol thus produced was evaluated in the same manner as in Example 1 and the results are collectively shown in Table 2.

Example 4

To 60 parts by mass of the polyvinyl acetate solution PVAc-A, 40 parts by mass of an aqueous acetic acid solution (pH of 1.5) with a concentration of 50 mass % was added and same operations were conducted later as those in the method described in Example 1 to obtain a polyvinyl acetate (cobalt content of 4 ppm). In methanol, 85 parts by mass of the polyvinyl acetate thus obtained was dissolved to have a concentration of 5 mass % and added to the same reactor as that in Polymerization Example 1. Saponification was conducted in the same manner as in Example 1 other than changing the amount of the methanol solution (concentration of 14 mass %) of sodium hydroxide to be added to this solution to 3.9 parts by mass and the molar ratio of sodium hydroxide to vinyl acetate monomer units in the polyvinyl acetate to 0.01 to yield a polyvinyl alcohol. The polyvinyl alcohol thus produced was evaluated in the same manner as in Example 1 and the results are collectively shown in Table 2.

Example 5

To 60 parts by mass of the polyvinyl acetate solution PVAc-B, 40 parts by mass of an aqueous acetic acid solution (pH of 3.5) with a concentration of 0.1 mass % was added and same operations were conducted later as those in the method described in Example 1 to obtain a polyvinyl acetate (cobalt content of 92 ppm). The polyvinyl acetate thus obtained was saponified in the same manner as in Example 1 to yield a polyvinyl alcohol. The polyvinyl alcohol thus produced was evaluated in the same manner as in Example 1 and the results are collectively shown in Table 2.

Example 6

To 60 parts by mass of the polyvinyl acetate solution PVAc-B, 40 parts by mass of an aqueous phosphoric acid solution (pH of 1.1) with a concentration of 10 mass % was added and same operations were conducted later as those in the method described in Example 1 to obtain a polyvinyl acetate (cobalt content of 76 ppm). The polyvinyl acetate thus obtained was saponified in the same manner as in Example 1 to yield a polyvinyl alcohol. The polyvinyl alcohol thus produced was evaluated in the same manner as in Example 1 and the results are collectively shown in Table 2.

Example 7

To 60 parts by mass of the polyvinyl acetate solution PVAc-B, 40 parts by mass of an aqueous phosphoric acid solution (pH of 0.6) with a concentration of 25 mass % was added and same operations were conducted later as those in the method described in Example 1 to obtain a polyvinyl acetate (cobalt content of 30 ppm). The polyvinyl acetate thus obtained was saponified in the same manner as in Example 1 to yield a polyvinyl alcohol. The polyvinyl alcohol thus produced was evaluated in the same manner as in Example 1 and the results are collectively shown in Table 2.

Example 8

To 60 parts by mass of the polyvinyl acetate solution PVAc-B, 40 parts by mass of an aqueous propionic acid solution (pH of 2.6) with a concentration of 10 mass % was added and same operations were conducted later as those in the method described in Example 1 to obtain a polyvinyl acetate (cobalt content of 29 ppm). The polyvinyl acetate thus obtained was saponified in the same manner as in Example 1 to yield a polyvinyl alcohol. The polyvinyl alcohol thus produced was evaluated in the same manner as in Example 1 and the results are collectively shown in Table 2.

Example 9

To 60 parts by mass of the polyvinyl acetate solution PVAc-B, 40 parts by mass of an aqueous lactic acid solution (pH of 2.1) with a concentration of 10 mass % was added and same operations were conducted later as those in the method described in Example 1 to obtain a polyvinyl acetate (cobalt content of 44 ppm). The polyvinyl acetate thus obtained was saponified in the same manner as in Example 1 to yield a polyvinyl alcohol. The polyvinyl alcohol thus produced was evaluated in the same manner as in Example 1 and the results are collectively shown in Table 2.

Example 10

To 60 parts by mass of the polyvinyl acetate solution PVAc-B, 40 parts by mass of an aqueous citric acid solution (pH of 2.0) with a concentration of 10 mass % was added and same operations were conducted later as those in the method described in Example 1 to obtain a polyvinyl acetate (cobalt content of 49 ppm). The polyvinyl acetate thus obtained was saponified in the same manner as in Example 1 to yield a polyvinyl alcohol. The polyvinyl alcohol thus produced was evaluated in the same manner as in Example 1 and the results are collectively shown in Table 2.

Comparative Example 1

The polyvinyl acetate solution PVAc-B was dried in the conditions of 30° C. and 0.1 atmospheric pressure to obtain polyvinyl acetate (cobalt content of 10100 ppm) after removal of the volatile component. The polyvinyl acetate thus obtained was saponified in the same manner as in Example 1 to yield a polyvinyl alcohol. The polyvinyl alcohol thus produced was evaluated in the same manner as in Example 1 and the results are collectively shown in Table 2.

Comparative Example 2

To 60 parts by mass of the polyvinyl acetate solution PVAc-B, 40 parts by mass of ion-exchange water (pH of 6.9) with a concentration of 10 mass % was added and same operations were conducted later as those in the method described in Example 1 to obtain polyvinyl acetate (cobalt content of 7650 ppm). The polyvinyl acetate thus obtained was saponified in the same manner as in Example 1 to yield a polyvinyl alcohol. The polyvinyl alcohol thus produced was evaluated in the same manner as in Example 1 and the results are collectively shown in Table 2.

Comparative Example 3

To 60 parts by mass of the polyvinyl acetate solution PVAc-B, 40 parts by mass of an aqueous 1-propanethiol solution, not being a water-soluble ligand, (pH of 6.7) with a concentration of 0.1 mass % was added and same operations were conducted later as those in the method described in Example 1 to obtain polyvinyl acetate (cobalt content of 890 ppm). In this situation, 1-propanethiol has less than 1 g of solubility in 100 g of water at 25° C. The polyvinyl acetate thus obtained was saponified in the same manner as in Example 1 to yield a polyvinyl alcohol. The polyvinyl alcohol thus produced was evaluated in the same manner as in Example 1 and the results are collectively shown in Table 2.

The invention claimed is:

1. A method for producing a polyvinyl alcohol, the method comprising:
   polymerizing vinyl ester monomers by controlled radical polymerization in the presence of a radical initiator and an organic cobalt complex to obtain a polymer solution comprising a polyvinyl ester;
   extracting a cobalt complex from the polymer solution by contacting an aqueous solution comprising a water-soluble ligand with the polymer solution; and
   saponifying the polyvinyl ester after the extracting to obtain the polyvinyl alcohol;
   wherein the polymerization is bulk polymerization or solution polymerization.

2. The method of claim 1, wherein the polyvinyl ester after the extracting has a cobalt element content from 0.01 to 100 ppm.

3. The method of claim 1, wherein the polyvinyl alcohol after the saponifying has a cobalt element content from 0.01 to 50 ppm.

4. The method of claim 1, wherein the water-soluble ligand is an acid having a pKa at 25° C. from 0 to 12.

5. The method of claim 1, wherein the water-soluble ligand is a carboxylic acid.

6. A method for producing a polyvinyl alcohol, the method comprising:

TABLE 1

| | VAc | Solvent | | Initiator | | Type of Control | | | Terminator | | |
|---|---|---|---|---|---|---|---|---|---|---|---|
| | Added Amount [parts by mass] | Type | Added Amount [parts by mass] | Type | Added Amount [parts by mass] | Type | Added Amount [parts by mass] | Polymerization Temperature [° C.] | Type | Added Amount [parts by mass] | PVAc solution |
| Polymerization Example 1 | 99.83 | — | — | V-70 | 0.13 | Co(acac)$_2$ | 0.04 | 30 | Sorbic Acid | 0.36 | PVAc-A |
| Polymerization Example 2 | 99.77 | — | — | V-70 | 0.18 | Co(acac)$_2$ | 0.05 | 30 | Sorbic Acid | 0.72 | PVAc-B |
| Polymerization Example 3 | 79.94 | Methyl Acetate | 19.98 | V-70 | 0.06 | Co(acac)$_2$ | 0.02 | 30 | Sorbic Acid | 0.23 | PVAc-C |

TABLE 2

| | PVAc Solution | Washing Aqueous Solution | | | Co Content before Sapo-nification [ppm] | Degree of Saponi-fication [mol %] | Mn | Mw/Mn | Co Content after Sapo-nification [ppm] | Hue YI | Rate of Dissolution |
|---|---|---|---|---|---|---|---|---|---|---|---|
| | | Type | Concentration [mass %] | pH | | | | | | | |
| Example 1 | PVAc-A | Acetic Acid | 25 | 2.0 | 5 | 99.9 | 108,600 | 1.5 | 1 | 25.6 | A |
| Example 2 | PVAc-B | Acetic Acid | 10 | 2.3 | 20 | 99.9 | 28,500 | 1.3 | 8 | 60.5 | A |
| Example 3 | PVAc-C | Acetic Acid | 10 | 2.3 | 8 | 99.9 | 89,100 | 1.5 | 2 | 35.8 | A |
| Example 4 | PVAc-A | Acetic Acid | 50 | 1.5 | 4 | 88.0 | 108,400 | 1.5 | 1 | 30.1 | B |
| Example 5 | PVAc-B | Acetic Acid | 0.1 | 3.5 | 92 | 99.9 | 28,400 | 1.3 | 42 | 84.5 | C |
| Example 6 | PVAc-B | Phosphoric Acid | 10 | 1.1 | 76 | 99.9 | 28,500 | 1.4 | 35 | 74.8 | C |
| Example 7 | PVAc-B | Phosphoric Acid | 25 | 0.6 | 30 | 99.9 | 28,600 | 1.3 | 18 | 72.6 | B |
| Example 8 | PVAc-B | Propionic Acid | 10 | 2.6 | 29 | 99.9 | 28,500 | 1.4 | 12 | 62.9 | B |
| Example 9 | PVAc-B | Lactic Acid | 10 | 2.1 | 44 | 99.9 | 28,600 | 1.4 | 24 | 67.1 | C |
| Example 10 | PVAc-B | Citric Acid | 10 | 2.0 | 49 | 99.9 | 28,400 | 1.4 | 28 | 68.4 | C |
| Comparative Example 1 | PVAc-B | — | — | — | 10100 | 99.9 | 28,600 | 1.5 | 6880 | 164.2 | E |
| Comparative Example 2 | PVAc-B | Water | — | 6.9 | 7650 | 99.9 | 28,600 | 1.5 | 5120 | 145.3 | E |
| Comparative Example 3 | PVAc-B | Propanethiol | 0.1 | 6.7 | 890 | 99.9 | 28,600 | 1.4 | 498 | 170.7 | E | adding vinyl ester monomers, a radical initiator and an organic cobalt (II) complex to a reactor;

polymerizing the vinyl ester monomers by controlled radical polymerization in the reactor to obtain a polymer solution comprising a polyvinyl ester;

extracting a cobalt complex from the polymer solution by contacting an aqueous solution comprising a water-soluble ligand with the polymer solution; and saponifying the polyvinyl ester after the extracting to obtain the polyvinyl alcohol.

7. The method of claim 6, wherein the polyvinyl ester after the extracting has a cobalt element content from 0.01 to 100 ppm.

8. The method of claim 6, wherein the polyvinyl alcohol after the saponifying has a cobalt element content from 0.01 to 50 ppm.

9. The method of claim 6, wherein the water-soluble ligand is an acid having a pKa at 25° C. from 0 to 12.

10. The method of claim 6, wherein the water-soluble ligand is a carboxylic acid.

11. A method for producing a polyvinyl alcohol, the method comprising:

polymerizing vinyl ester monomers by controlled radical polymerization in the presence of a radical initiator and an organic cobalt complex to obtain a polymer solution comprising a polyvinyl ester;

extracting a cobalt complex from the polymer solution by contacting an aqueous solution comprising a water-soluble ligand with the polymer solution; and saponifying the polyvinyl ester after the extracting to obtain the polyvinyl alcohol, wherein the radical initiator is selected from the group consisting of azo initiators, peroxide initiators and redox initiators.

12. The method of claim 11, wherein the polyvinyl ester after the extracting has a cobalt element content from 0.01 to 100 ppm.

13. The method of claim 11, wherein the polyvinyl alcohol after the saponifying has a cobalt element content from 0.01 to 50 ppm.

14. The method of claim 11, wherein the water-soluble ligand is an acid having a pKa at 25° C. from 0 to 12.

15. The method of claim 11, wherein the water-soluble ligand is a carboxylic acid.

* * * * *